United States Patent [19]
Janssen et al.

[11] Patent Number: 5,569,010
[45] Date of Patent: Oct. 29, 1996

[54] ATTACHMENT MEMBER UNIT TO BE DRIVEN INTO HARD RECEIVING MATERIAL BY POWDER CHARGE OPERATED SETTING TOOL

[75] Inventors: Rupert Janssen, Meiningen, Austria; Markus Froewis, München, Germany; Friedrich Groeschel, Buchs; Luc Guillon, Sax, both of Switzerland

[73] Assignee: Hilti Aktiengesellschaft, Furstentum, Liechtenstein

[21] Appl. No.: 419,337

[22] Filed: Apr. 10, 1995

[30] Foreign Application Priority Data

Apr. 9, 1994 [DE] Germany .................. 44 12 228.4

[51] Int. Cl.⁶ .................. F16B 15/00; F16B 15/02
[52] U.S. Cl. .................. 411/441; 411/480; 411/544
[58] Field of Search .................. 411/440, 441, 411/480, 482, 542, 544

[56] References Cited

U.S. PATENT DOCUMENTS

| | | | |
|---|---|---|---|
| 3,491,933 | 1/1970 | Thurner et al. | 411/441 X |
| 4,915,561 | 4/1990 | Buhri et al. | 411/441 X |
| 4,986,709 | 1/1991 | Hachtel et al. | 411/441 X |
| 5,261,770 | 11/1993 | Hoepker et al. | 411/441 |

FOREIGN PATENT DOCUMENTS 1603703  9/1970  Germany .................. 411/441

*Primary Examiner*—Neill R. Wilson
*Attorney, Agent, or Firm*—Anderson, Kill & Olick P.C.

[57] ABSTRACT

Attachment member unit includes an axially extending shank (1) with a load engagement part (2) at its trailing end. The shank has a pointed tip (3) at its leading end. A prestressing element (4) laterally encloses the pointed tip (3). The prestressing element is formed of a sleeve part (4a) and a bearing part (4b). The bearing part forms the leading end of the prestressing element and the sleeve part forms its trailing end. A recess (4c) extends into the bearing part from the leading end. The recess (4c) has a diameter such that the trailing end portion of the prestressing element under deforming forces can telescope into the bearing part. When the attachment member unit is driven, the prestressing element (4) causes a prestress against a connector member (7) and due to the telescoping action and also a dampening action, the connector member can be fastened to a receiving material (8) by the shank (1), and the connecting member is not damaged.

9 Claims, 3 Drawing Sheets

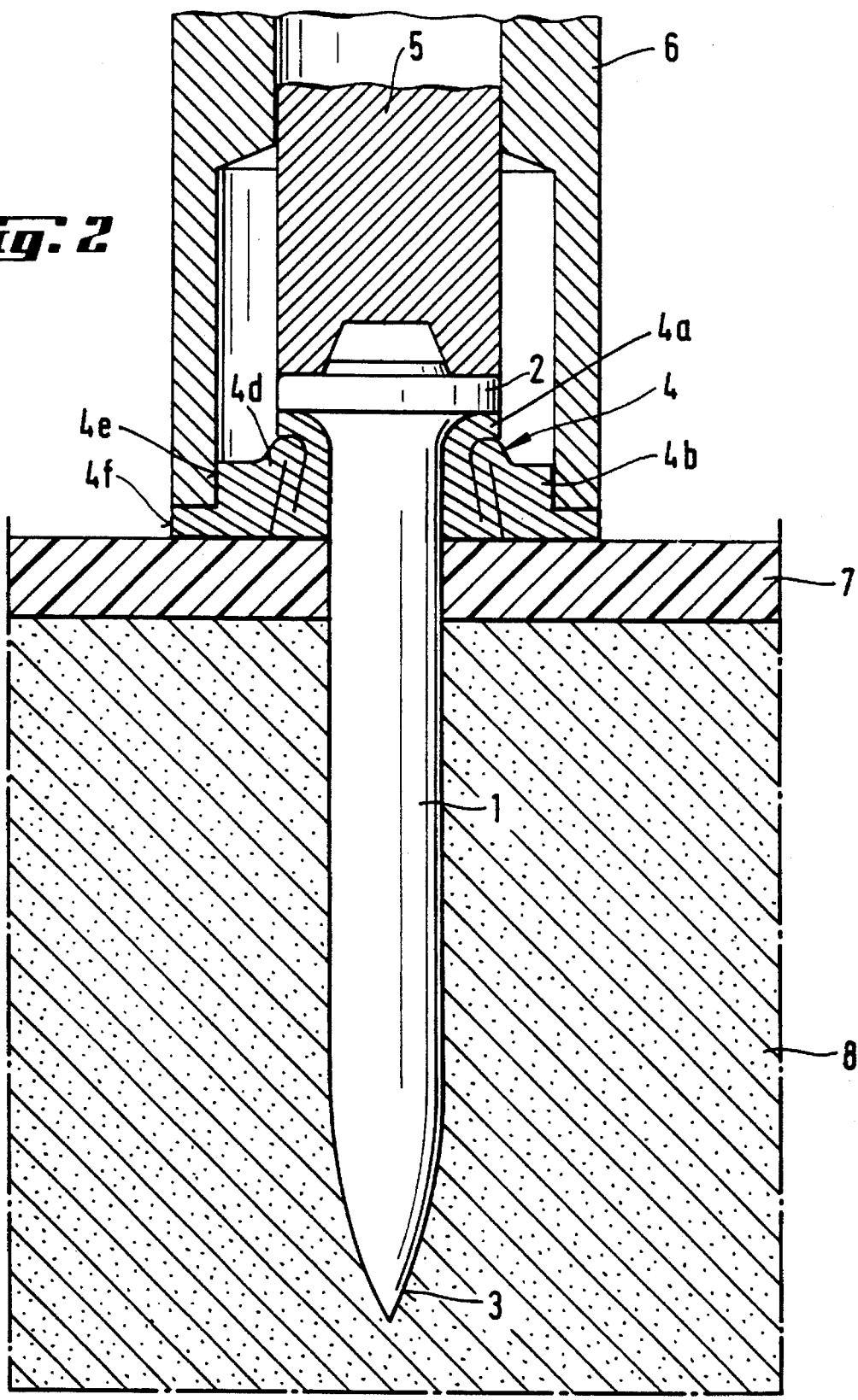

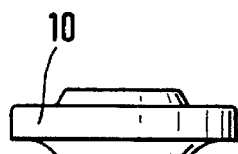
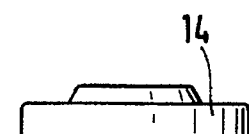

ATTACHMENT MEMBER UNIT TO BE DRIVEN INTO HARD RECEIVING MATERIAL BY POWDER CHARGE OPERATED SETTING TOOL

BACKGROUND OF THE INVENTION

The present invention is directed to an attachment member unit to be driven into a hard receiving material by an explosive powder charge operated setting tool. The attachment member unit includes an axially extending shank with a load engagement means at its trailing end and a pointed tip at its leading end. At least the tip is laterally enclosed by a prestressing element formed of a sleeve part at its trailing end and a flange-like bearing part at its leading end with the bearing part having an outside diameter greater than the outside diameter of the sleeve part.

Attachment member units of the above type are driven into hard receiving materials, such as concrete, masonry, rock, steel and the like. Explosive powder charge operated setting tools are used for driving the attachment member units. A preferred use of such attachment member units is the fastening of connecting members to structural parts formed of hard receiving materials of the above-mentioned types. Such connecting members can be cable ducts, cable clamps, pipe clamps, insulation panels, suspensions and the like. The fastening of the connecting members is performed so that after the completion of the driving operation, a shoulder on a load engagement means abuts the connecting member and presses or stresses it against the receiving material.

The load engagement means of the attachment member unit can be shaped in various ways. For instance, it can be a head with its diameter projecting laterally outwardly beyond the diameter of the shank of the attachment member unit. Instead of a head, the load engagement means can be a thread projecting beyond the diameter of the shank and serving to receive a nut and also forming a shoulder.

The connecting members under consideration are formed mostly of plastics material, for reasons of economy and also in certain cases for reasons of insulation. The use of plastics material for the connecting member along with the type of attachment member unit using explosive powder charge operated setting tools creates certain problems. It must be assured that the connecting members are sufficiently pressed or stressed against the receiving material. This feature requires a defined setting depth of the attachment member unit, so that on one hand the danger of an inadequate stressing is prevented while on the other hand the danger of destruction of the connecting member is avoided.

It is difficult to assure a precise attachment depth when using explosive powder charge operated setting tools, the use of which is preferred in the present case for reasons of economy. This problem occurs because of the mainly non-homogeneneity of the receiving material and also because of the variations in the energy output of the explosive powder charges used. If the attachment member does not penetrate sufficiently deeply, the connecting member is insufficiently pressed against the receiving material. On the other hand, if the attachment member penetrates too deeply into the receiving material, there is the danger that the connecting member may be destroyed.

An attachment member unit is known from DE-PS 16 25 367 for avoiding the destruction of brittle materials where the unit has an initial pressing or prestressing element at its tip. The prestressing element has a flange-like bearing part at its leading end followed towards the trailing end by a sleeve part. The tip is located flush with the leading end face of the bearing part.

With this known attachment member unit the brittle material is intended to be prestressed by the prestressing element during the driving operation, so that it is not destroyed. In this known attachment member unit the tip begins to penetrate into the brittle material at the start of the driving operation before the prestressing element is able to generate an adequate prestress and the effect is unsatisfactory with the possible destruction of the brittle material taking place.

SUMMARY OF THE INVENTION

Therefore, the primary object of the present invention is to provide an attachment member unit which can be driven into or through brittle material without causing its destruction.

In accordance with the present invention, the leading end of the tip of the shank is positioned rearwardly of the leading end face of the bearing part of the prestressing element.

The arrangement of the attachment member unit in the present invention assures that at the start of the driving operation initially the material on which the prestressing element bears is adequately prestressed and, only after attaining such prestress, the tip of the shank begins to penetrate into the material of the connecting member. Due to the adequate prestress, there is no destruction of the material of the connecting member against which the prestressing element bears.

If a connecting member, for instance formed of plastics material, is to be secured to a hard receiving material of the type mentioned above, the prestressing element bears against the connecting member and prestresses it sufficiently before the tip of the shank penetrates and provides the requisite support of the connecting member against the receiving material.

The tip of the shank is offset rearwardly from the leading end of the bearing part of the prestressing element measured parallel to the driving direction, that is, the direction between the trailing end and leading end of the attachment member unit. This amount assures that the impact of the shank tip is delayed for a time period, whereby a sufficient prestress can be established.

Furthermore, to assure that the connecting member is not destroyed when the shoulder of the load engagement means impacts against it, the prestressing element, preferably formed of ductile steel, must also have specific dampening properties. These dampening properties are assured by the sleeve part of the prestressing element where the sleeve part is deformed in case excess energy exists. Such deformation can occur by a pure axial upsetting of the sleeve portion.

In certain cases, if the connecting member is a cable duct, the fastened height of the sleeve portion can have disturbing effects, since a portion of the internal space of the cable duct is lost due to the fastened height. To avoid the problems involved with the fastened height, the dampening property of the prestressing element is assured in certain embodiments of the invention by providing a telescoping effect of the prestressing element when the attachment member unit is driven.

Preferably, the leading end of the bearing part has a centered recess bordered laterally by a cylindrical wall to afford the telescoping effect as mentioned above. The diameter of the cylindrical wall of the recess corresponds at least to the outside diameter of the sleeve part adjacent the bearing part.

With the penetration of the attachment unit along with the related coordination of the diameters of the different parts, it is possible to adapt the setting depth in such a manner that the sleeve part is driven into the recess in the bearing part with a corresponding material deformation. As a result, the fastened height can be considerably reduced.

To assure adequate dampening properties, the penetration of the recess measured in the driving direction preferably corresponds at the most to the height of the bearing part measured in the driving direction. This assures the remainder of a deformable material share.

The deformation can be controlled by arranging a connecting part between the sleeve part and the bearing part with the connecting part widening toward the bearing part. This widening or conically shaped wall is preferably adapted relative to the penetration so that the larger inside diameter of the conical wall corresponds to the diameter of the recess.

For attaining a sufficient prestress, it is advantageous if the inside surface of the sleeve part tapers inwardly toward the leading end. The tapered arrangement can extend in a straight line manner or in a ball like or spherical manner, so that the tapered surface contacts the pointed tip of the shank.

The control of the dampening while making use of the telescoping effect can be refined, if the outside surface of the sleeve part tapers inwardly toward the leading end, that is, in the driving direction. Due to the appropriate arrangement of the diameters of the prestressing element, a radially acting material deformation can be incorporated with the axially acting material deformation.

With reference to the guidance properties and the retention properties in connection with the explosive powder charge operated setting tool being used, it is advantageous if the outside surface of the bearing part is provided with two steps with the step at the leading end having a larger diameter. The larger diameter step can bear in the trailing end direction against the mouth of the setting tool.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIG. 2 is an axially extending view of the attachment member unit in FIG. 1 with the parts of the setting tool in position after driving of the attachment member;

FIG. 3 is an axially extending view, partially in section, of another attachment member embodying the present invention with a telescoping prestressing element; and FIG. 4 is an axially extending view of still another attachment member unit embodying the present invention with an axially upsettable prestressing element.

DETAILED DESCRIPTION OF THE INVENTION

Figure 1:
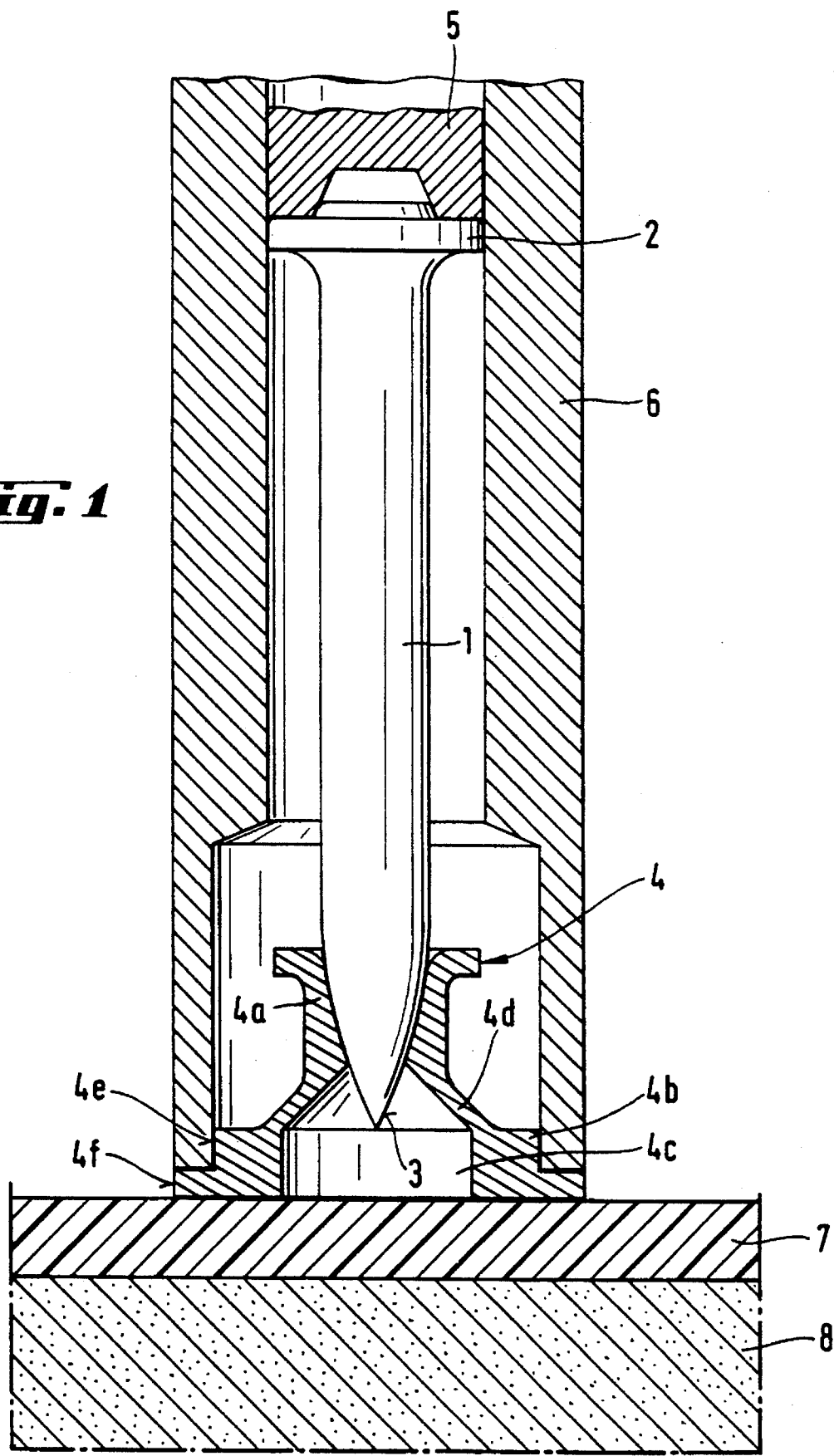
FIG. 1 is an axially extending view of an attachment member unit, partially in section, embodying the present invention along with parts of a setting tool in position for driving the attachment member.

In FIGS. 1 and 2 the parts of the attachment member unit are illustrated with a leading end directed downwardly and a trailing end directed upwardly with the driving direction being in the downward direction.

In FIGS. 1 and 2 an attachment member unit is shown including an axially extending shank 1 with a load engagement means 2 in the shape of a head at its trailing end. At its leading end, shank 1 has a pointed tip 3. Further, as shown in FIG. 1, the pointed tip 3 is laterally enclosed by an axially extending prestressing element 4. Prestressing element 4 includes an axially extending sleeve part 4a extending from the trailing end towards the leading end and a bearing part 4b extending from the leading end towards the trailing end. In the bearing part 4b there is a recess 4c extending axially inwardly from the leading end. Further, a connecting part 4d extends axially between the sleeve part 4a and the bearing part 4b with the wall forming the connecting part 4d having a conical shape widening towards the leading end of the prestressing element. The largest inside diameter of the connecting part 4d is the same as the diameter of the cylindrical wall bounding the recess 4c. The inside surface of the sleeve part 4a tapers inwardly from the trailing end towards the leading end and has a configuration corresponding to the shape of the surface of the pointed tip 3.

Furthermore, FIGS. 1 and 2 illustrate parts of an explosive powder charge setting tool with an axially extending mouth 6 laterally enclosing the shank 1 and the prestressing element 4 and a driving piston 5 bearing against the load engagement means 2 within the mouth. The radially outer surface of the bearing part 4b is formed with two steps, that is, a step 4e with a smaller diameter projecting into the mouth 6 and a step 4f with a larger diameter extending axially from the end face of the mouth 6 with the stepped arrangement retaining the attachment member unit in the mouth of the setting tool.

In FIG. 1, the attachment member unit is in condition ready to be driven with the prestressing element 4 bearing at its leading end against a connector member 7 to the fastened to the hard receiving material 8.

In FIG. 2, the attachment member unit is shown after the driving operation has been completed. The pointed tip 3 as well as the shank 1 have penetrated through the connector member 7 into the receiving material 8. The dampening properties of the prestressing element 4 have been completely used with the sleeve part 4a of the prestressing element 4 displaced in a telescoping manner into the recess 4c in the bearing part 4b.

It is shown particularly clearly in FIG. 2, because of the telescoping effect of the prestressing element 4, how a very small and therefore non-interfering fastening height is obtained.

FIG. 3 displays another attachment member unit comprising an axially extending shank 9 with a load engagement means 10 in the shape of a head at the trailing end. At its leading end, the shank 9 has a pointed tip 11.

Tip 11 is laterally enclosed by a prestressing element 12. Prestressing element 12 is formed of an axially extending sleeve part 12a and a bearing part 12b. The sleeve part 12a has an inside surface tapering inwardly towards the leading end and an outside surface also tapering inwardly towards the bearing part 12b. As a result, the sleeve part has a wall thickness decreasing towards the leading end of the prestressing element. The bearing part 12b has a cylindrical recess 12c centered on the axis of the shank 9 and open at the leading end of the prestressing element. The axially extending outside surface of the bearing part 12b has two steps, with a smaller diameter first step 12d located at the trailing end of the bearing part and a larger diameter second step 12e extending from the first step to the leading end of the prestressing element.

The dampening properties of the prestressing element 12 as shown in FIG. 3 are achieved by a telescoping effect.

Another attachment member unit is displayed in FIG. 4 with an axially extending shank 13 having a load engagement means 14 in the shape of a head at its trailing end. At its leading end, the shank 13 has a pointed tip 15.

The tip 15 is laterally enclosed by a prestressing element 16 comprised of an axially extending sleeve part 16a and an axially extending bearing part 16b. The sleeve part 16a has a cylindrical outside surface and an inside surface tapering inwardly towards the leading end of the prestressing element. Bearing part 16b has central bore 16c with a diameter corresponding to the smallest diameter of the tapered surface of the sleeve part 16a. The radially outer surface of the bearing part 16b has two steps. A first step 16d with a smaller diameter and a second step 16e with a larger diameter with the second step located at the leading end of the prestressing element 16 and followed by the first step 16d.

The dampening qualities of the prestressing element 16 in FIG. 4 are achieved by the axial upsettability of the sleeve part 16a.

While specific embodiments of the invention have been shown and described in detail to illustrate the inventive principles, it will be understood that the invention may be embodied otherwise without departing from such principles.

We claim:

1. Attachment member unit to be driven into a hard receiving material (8) by an explosive powder charge operated setting tool comprising an axially extending shank (1, 9, 13) having a leading end and a trailing end relative to the direction the shank is driven into the receiving material, said shank (1, 9, 13) has a pointed tip (3, 11, 15) at the leading end and a load engagement means (2, 10, 14) at the trailing end, and an axially extending prestressing element (4, 12, 16) laterally enclosing said pointed tip (3, 11, 15), said prestressing element (4, 12, 16) having a leading end and a trailing end with a sleeve part (4a, 12a, 16a) having an outside diameter and extending axially from the trailing end toward the leading end and a flange-like bearing part having an outside diameter and extending axially from the leading end towards the trailing end, the outside diameter of said bearing part is greater than the outside diameter of said sleeve part, wherein the improvement comprises that the pointed tip (3, 11, 15) of said shank (1, 9, 13) is spaced axially from the leading end formed by said bearing part (4b, 12b, 16b) of said prestressing element (4, 12, 16) towards the trailing end thereof, and said pointed tip (3, 11, 15) is spaced from the leading end of the said prestressing element by an amount corresponding to the axial dimension of said bearing part (4b, 12b, 16b) measured in the leading end-trailing end direction.

2. Attachment member unit, as set forth in claim 1, wherein the leading end of said bearing part (4b, 12b) has a centered recess (4c, 12c) bounded by a cylindrical wall extending in the leading end-trailing end direction.

3. Attachment member unit, as set forth in claim 2, wherein the cylindrical wall of said recess (4c, 12c) has a diameter corresponding at least to an outside diameter of said sleeve part (4a, 12a) adjacent said bearing part (4b, 12b).

4. Attachment member unit, as set forth in claim 3, wherein said recess (4c, 12c) has a dimension extending in the leading end-trailing end direction equal at most to the dimension of the bearing part (4b, 12b) measured in the leading end-trailing end direction.

5. Attachment member unit, as set forth in claim 4, wherein said prestressing element includes an axially extending connecting part (4d) widening towards the leading end and extending between the sleeve part (4a) and the bearing part (4b).

6. Attachment member unit, as set forth in claim 5, wherein the connecting part (4d) has a largest inside diameter corresponding to the diameter of said recess (4c).

7. Attachment member unit, as set forth in claim 3, wherein said sleeve part (4a, 12a, 16a) has an axially extending inside surface tapering inwardly in the trailing end-leading end direction.

8. Attachment member unit, as set forth in claim 7, wherein said sleeve part (12a) has an outside surface tapering inwardly in the trailing end-driving end direction.

9. Attachment member unit, as set forth in claim 8, wherein said bearing part (4b, 12b, 16b) has an axially extending outside surface shaped with two steps each having a different diameter and with the step extending from the leading end of the prestressing element having a larger diameter than the other step.

* * * * *